United States Patent [19]
Alvarez

[11] 3,790,232
[45] Feb. 5, 1974

[54] HANDLE CONNECTION
[76] Inventor: Vicente Alvarez, San Jose 102-4° C, Zarogoza, Spain
[22] Filed: June 4, 1971
[21] Appl. No.: 149,919

[52] U.S. Cl. .................. 403/192, 15/145, 403/317
[51] Int. Cl. ............................................. B25g 3/04
[58] Field of Search ............ 287/103 R, 103 D, 119; 15/145; 306/23, 25, 27, 22

[56] References Cited
UNITED STATES PATENTS

| | | | |
|---|---|---|---|
| 1,430,908 | 10/1922 | Kennedy | 306/27 |
| 735,667 | 8/1903 | Harvey | 287/103 D |
| 2,280,162 | 4/1942 | Rue | 287/119 R |
| 2,851,295 | 9/1958 | Chaffee | 287/119 R |
| 3,066,346 | 12/1962 | Hofstra et al. | 15/145 X |
| 3,397,420 | 8/1968 | Schneider | 287/103 R |

Primary Examiner—Andrew V. Kundrat
Attorney, Agent, or Firm—Berman, Bishoff & Platt

[57] ABSTRACT

A handle connection having a socket to receive the end of the handle and carrying a male bayonet fitting thereon. A head for a device such as a mop has a female bayonet socket thereon to receive the male bayonet connection member and a lock is adapted to be releasably engaged in a groove extending across the male bayonet member to lock the male bayonet member in the female socket. A plate is detachably connected to the head for securing a mop member to the head.

In modified forms of the invention the bayonet lock members are secured in engaged position by rings detachably engaged over the connection.

2 Claims, 22 Drawing Figures

PATENTED FEB 5 1974
3,790,232
SHEET 1 OF 3
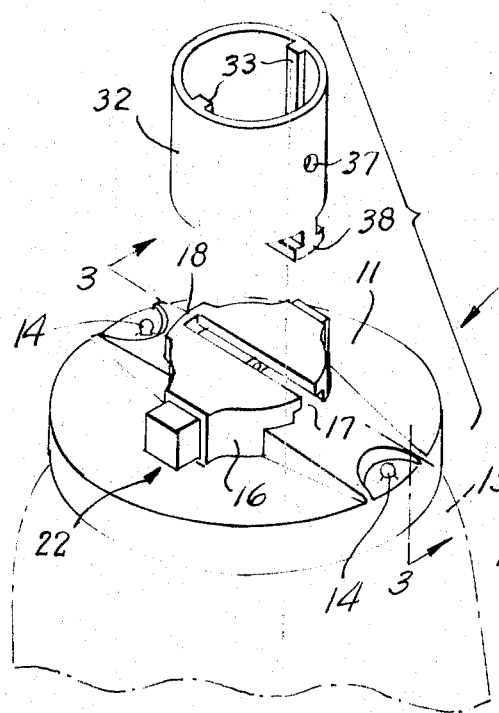
FIG. 1.
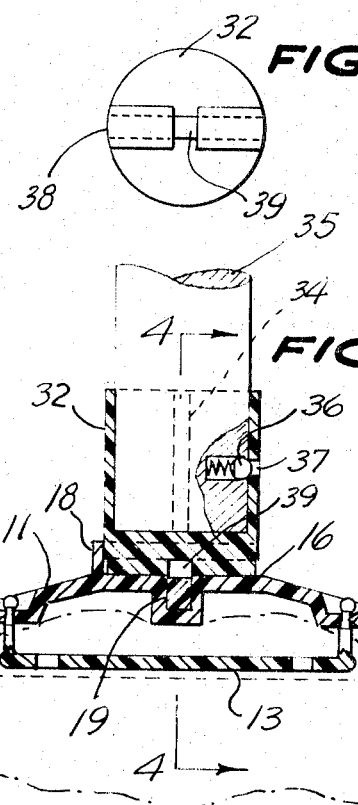
FIG. 2.
FIG. 3.
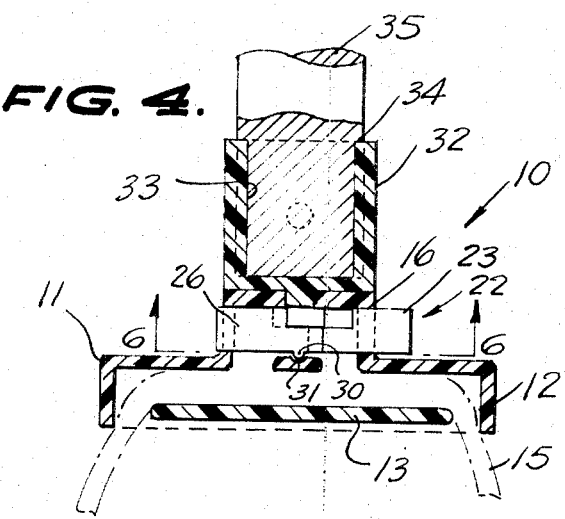
FIG. 4.
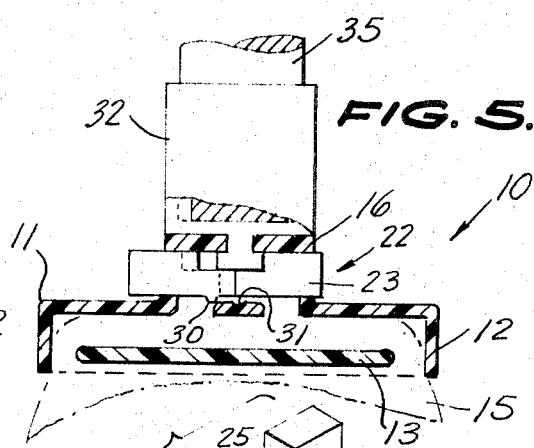
FIG. 5.
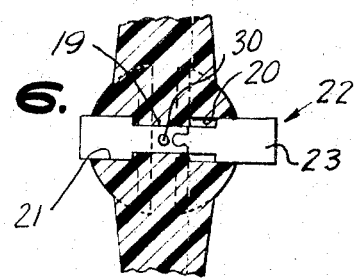
FIG. 6.
FIG. 7.
INVENTOR.
VICENTE ALVAREZ,
BY
Berman, Davidson & Berman,
ATTORNEYS.

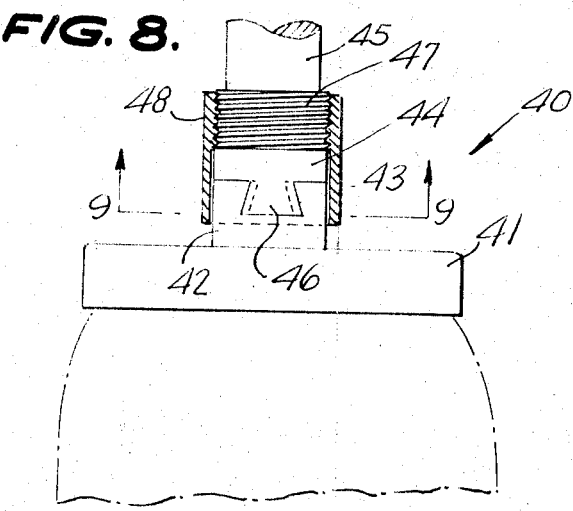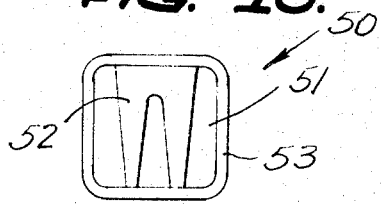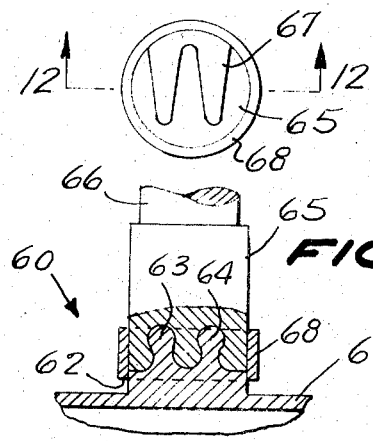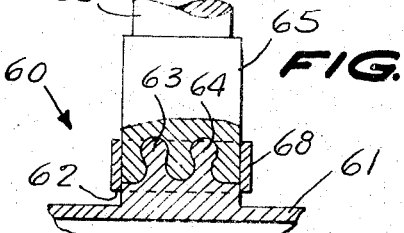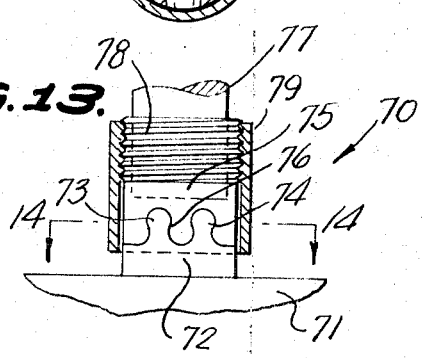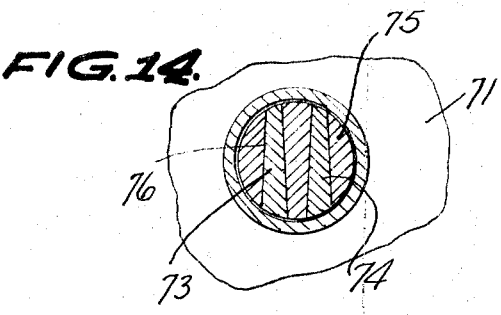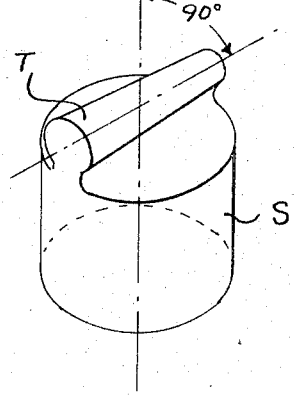
INVENTOR.
VICENTE ALVAREZ,
BY
Berman, Davidson & Berman
ATTORNEYS.

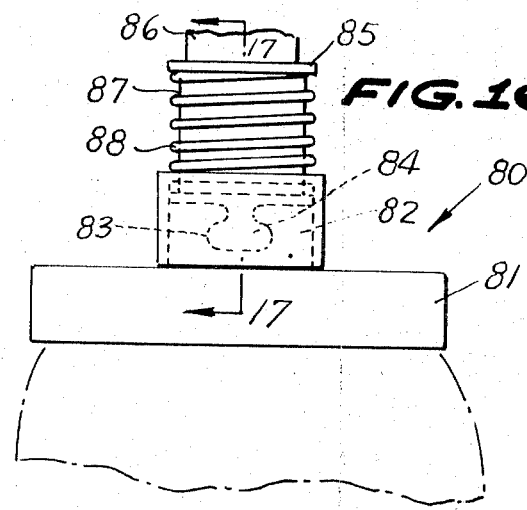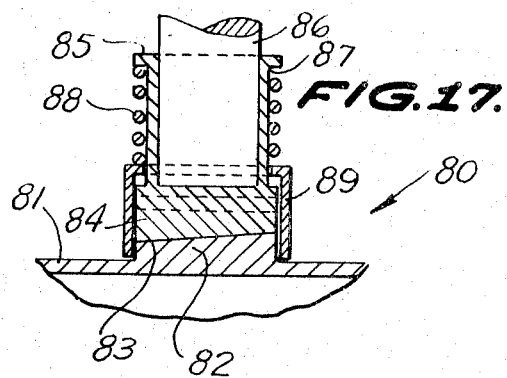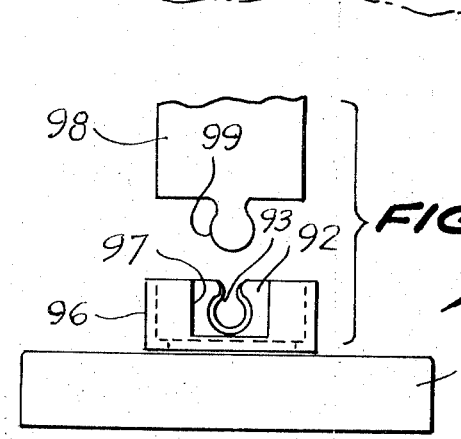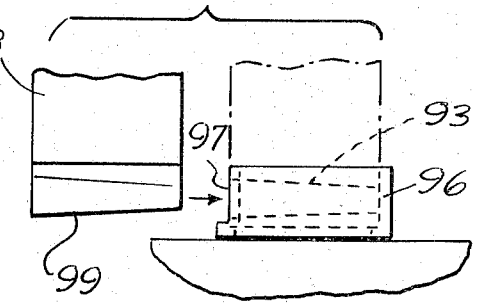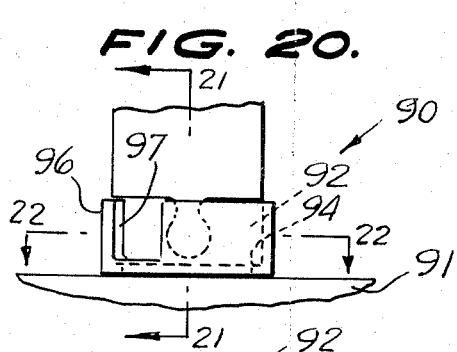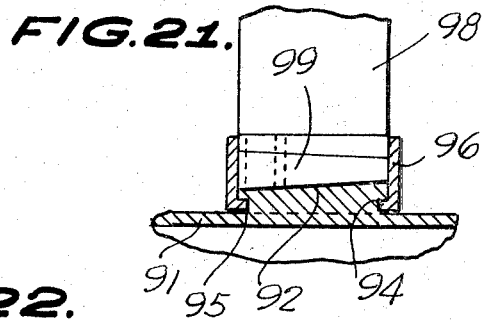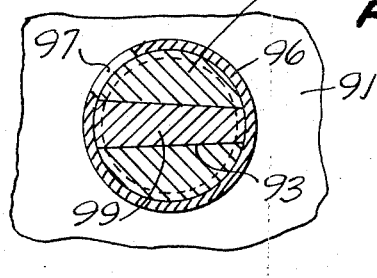

HANDLE CONNECTION

BACKGROUND OF THE INVENTION

FIELD OF THE INVENTION

The present invention relates to handle head connections for household tools such as mops, squeegees, floor washers and the like.

SUMMARY OF THE INVENTION

In general, the invention consists of transversely sliding bayonet connections between a handle socket member and the head of the device with disengageable lock members securing the bayonet connection in its engaged position.

The primary object of the invention is to provide a connection for connecting a handle to a head of a mop or similar household tool which will effectively prevent relative movement between the head and handle including axial rotation of the handle with respect to the head.

Other objects and advantages will become apparent from the following specification when considered in light of the attached drawings.

BRIEF DESCRIPTION OF THE DRAWINGS

FIG. 1 is a perspective view of the invention shown with the socket member exploded for convenience of illustration;

FIG. 2 is a bottom plan view of the socket member;

FIG. 3 is a vertical cross-section taken along the line 3—3 of FIG. 1 looking in the direction of the arrows with the socket member in place on the head;

FIG. 4 is a vertical sectional view taken along the line 4—4 of FIG. 3 looking in the direction of the arrows;

FIG. 5 is a view similar to FIG. 4, illustrating the lock in unlocked position;

FIG. 6 is a horizontal sectional view taken along the line 6—6 of FIG. 4 looking in the direction of the arrows;

FIG. 7 is an exploded perspective view of the lock member removed from the head and socket;

FIG. 8 is a side elevation of a modified form of the invention shown partially broken away and in section for convenience of illustration;

FIG. 9 is a transverse sectional view taken along the line 9—9 of FIG. 8 looking in the direction of the arrows;

FIG. 10 is a bottom plan view of a modified handle socket member detached from its head;

FIG. 11 is a bottom plan view of another modified form of handle socket member removed from the head;

FIG. 12 is a vertical sectional view taken along the line 12—12 of FIG. 11 with the socket member attached to the head;

FIG. 13 is a side elevation of another modified form of the invention shown partially broken away and in section for convenience of illustration;

FIG. 14 is a horizontal sectional view taken along the line 14—14 of FIG. 13 looking in the direction of the arrows;

FIG. 15 is a perspective view of a handle socket member detached from the handle and the head;

FIG. 16 is a side elevation of another modified form of the invention;

FIG. 17 is a vertical sectional view taken along the line 17—17 of FIG. 16 looking in the direction of the arrows;

FIG. 18 is an exploded side elevational view of another modified form of the invention shown partially broken away for convenience of illustration;

FIG. 19 is an exploded end elevation of the structure illustrated in FIG. 18;

FIG. 20 is a view similar to FIG. 18 with the parts assembled and the lock in locking position;

FIG. 21 is a vertical sectional view taken along the line 21—21 of FIG. 20, looking in the direction of the arrows; and FIG. 22 is a horizontal cross-section taken along the line 22—22 of FIG. 20 looking in the direction of the arrows.

BRIEF DESCRIPTION OF THE PREFERRED EMBODIMENTS

Referring now to the drawings in detail wherein like reference characters indicate like parts throughout the several figures, the reference numeral 10 indicates generally the mop head connection constructed in accordance with the invention.

The connection 10 forms part of a generally cylindrical head 11 having an annular depending flange 12 and a circular mop retaining plate 13 detachably secured to the head 11 by a pair of integral headed pins 14 extending upwardly from the plate 13. The plate 13 and the head 11 are adapted to have a mop 15 positioned therebetween and secured thereby.

The head 11 has an upstanding boss 16 integrally formed thereon and containing a transverse bayonet slot 17 which is open at one end and closed at 18 the opposite end. A generally rectangular bore 19 is formed centrally of the boss 16 to extend transversely of the lower part of the bayonet slot 17. A somewhat larger rectangular bore 20 extends from one end of the bore 19 through the side of the boss 16. A second larger rectangular bore 21 of the same size as the bore 20 extends from the other end of the bore 19 through the side of the boss 16.

A generally rectangular sliding lock member is indicated generally at 22 and includes a generally rectangular block 23 having a size slightly smaller than the rectangular bore 20 to be freely slidable therein. The block member 23 has a generally rectangular extension 24 integrally formed therewith and having a size slightly smaller than the rectangular bore 19 and freely slidable therein. A dovetail tongue 25 is integrally formed on the free end of the block 24 for reasons to be assigned. The lock member 22 also includes a generally rectangular block 26 having a size slighly smaller than the rectangular bore 21 and freely slidable therein. A generally rectangular extension 27 is integrally formed with the block 26 and has a size slightly smaller than the generally rectangular bore 19 and is freely slidable therein. A dovetail socket 28 is formed in the free end of the member 27 to cooperate with the dovetail tongue 25 securing the two ends of the lock member 22 together. A generally rectangular lock tongue 29 is integrally formed with the block 26 and the member 27, as can be seen in FIG. 7, for reasons to be assigned.

The lock member 22 is assembled from opposite ends of the boss 16 until the dovetail tongue 25 engages the dovetail socket 28 whereupon pressure on the opposite ends of the lock member 22 causes the tongue 25 to snap into the socket 28, securing the lock member 22 together within the boss 16. A detent button 30 is formed on the lower face of the extension member 27 and is adapted to engage in a detent socket 31 with the lock member 22 in one position in the boss 16 to releasably secure the locking member 22 in locking position.

A generally cylindrical handle socket member 32 has a pair of oppositely disposed upstanding keys 33 integrally formed on the interior thereof for engaging in slots 34 formed in opposite sides of the lower end of a handle member 35. The handle member 35 has a spring-pressed ball detent 36 which is adapted to engage in a bore 37 in the side of the socket member 32. A male bayonet slot tongue 38 is integrally formed on the bottom of the socket member 32 and extends transversely thereacross. A transverse slot 39 is formed in the lower portion of the bayonet tongue 38 intermediate the opposite ends thereof to receive the locking tongue 29 on the locking device 22.

In the use and operation of the invention, the handle 35 is inserted into the handle socket member 32 so that the spring ball detent 36 engages in the socket 37 to lock the handle 35 in the socket member 32. The socket member 32 is then engaged with the head 11 so that the bayonet tongue 38 moves into the bayonet slot 17 to align the lock tongue 29 with the slot 39. The locking device 22 is then pressed endwise to slide until the detent button 30 engages in the detent socket 31 and the lock tongue 29 engages in the slot 39 to thus lock the socket member 32 to the head 11.

The socket head combination and connection illustrated in FIGS. 1 through 7 rigidly secures the handle to the head and prevents relative motion therebetween including axial rotation of the handle with respect to the head.

In FIGS. 8 and 9, a modified form of handle head connection is illustrated generally at 40. The connection 40 includes a mop head 41 having an upstanding generally cylindrical boss 42 formed thereon. A tapered dovetail slot 43 extends transversely across the upper end of the boss 42 for reasons to be assigned. A handle socket member 44 is secured to the lower end of a handle 45 and has a tapered dovetail tongue 46 extending transversely across the lower end thereof for engagement in the dovetail socket 43. The socket member 44 is externally threaded at 47 from its upper end to receive an internally threaded locking sleeve 48 which is threaded down on to the threads 47 so that a lower unthreaded portion thereof engages around the dovetail socket 43 and the dovetail tongue 46 preventing them from being slid transversely for disconnection. The use of the structure illustrated in FIGS. 8 and 9 is identical to that of the invention illustrated in FIGS. 1 through 7.

In FIG. 10, a connection generally indicated at 50 is provided wherein a handle socket member 51 has a V-shaped dovetail socket 52 formed in the lower end thereof to receive a V-shaped dovetail tongue (not shown) on a mop head. The handle socket 51 is generally rectangular in cross-section and includes a generally rectangular locking sleeve 53. The use of the connection 50 is identical to that of the form of the invention illustrated in FIGS. 1 through 7.

In FIGS. 11 and 12, a modified form of handle head connection is illustrated generally at 60. In the handle head connection 60 a head 61 has an upstanding generally cylindrical boss 62 integrally formed thereon and carrying a pair of dovetail tongues 63, 64 on its upper end arranged in a generally V-form. A handle socket member 65 has a handle 66 rigidly secured thereto and is provided with a V-shaped dovetail socket 67 formed in its lower end.

A locking ring 68 frictionally engages about the dovetail tongues 63, 64 and a dovetail socket 67 to prevent the disconnection of the socket member 65 from the head 61. In FIGS. 13, 14 another modified form of handle head connection is illustrated generally at 70. The handle head connection 70 includes a head 71 having an upstanding generally cylindrical boss 72 integrally formed therewith and carrying a pair of transversely extending tapered dovetail tongues integrally formed therewith. The tongues 73, 74 are arranged so that a tapered socket portion is formed therebetween.

A handle socket member 75 of generally cylindrical form has a double tapered socket 76 in its lower end to receive the tongues 73, 74.

The handle socket member 75 has a handle 77 rigidly secured therein and is externally threaded at 78 to receive an internally threaded locking sleeve 79 which is adapted to engage over the ends of the tongues 73, 74 and the socket 76 to prevent the disengagement thereof during use of the mop.

In FIG. 15, a socket member S is illustrated with a tapered dovetail tongue T integrally formed thereon. The tapered dovetail tongue T has its axis extending perpendicularly to the axis of the handle socket member S to facilitate the connection and disconnection of the tongue T from its respective socket (not shown). The structure illustrated in FIG. 15 is applicable to each of the dovetail connections illustrated in FIGS. 8 through 15 and 16 through 22.

In FIGS. 16, 17 another modified form of handle head connection is illustrated generally at 80.

The handle head connection 80 includes a generally cylindrical head 81. A tapered dovetail socket 83 extends transversely across the upper end of the boss 82 and is adapted to receive a tapered dovetail tongue 84 integrally formed on the lower end of a handle socket member 85. A handle 86 is rigidly secured in the handle socket member 85. A reduced diameter relatively wide groove 87 is formed on the outer surface of the handle socket member 85 to receive a compression coil spring 88 and a flanged lock ring 89 slidably mounted in the groove 87. The compression spring 88 engages against the lock ring 89 and normally urges the lock ring 89 into locking position encompassing the boss 82 and the opposite ends of the socket 83 and tongue 84 locking them against transverse disconnection.

The use and operation of the invention illustrated in FIGS. 16 and 17 is identical to that of the form of the invention illustrated in FIGS. 1 through 7.

In FIGS. 18 through 22, another modified form of handle head connection is illustrated generally at 90.

The handle head connection 90 includes a generally cylindrical head 91 having an upstanding cylindrical boss 92 integrally formed thereon with a transverse tapered dovetail socket 93 extending thereacross. An annular groove 94 is formed at the base of the boss 92 to receive a flange 95 extending inwardly on a rotatable locking ring 96. The locking ring 96 has an open space 97 formed therein for reasons to be assigned.

A handle socket member 98 is provided on its lower end with a tapered dovetail tongue 99 extending transversely thereacross. The tapered dovetail tongue 99 is adapted to be seated in the tapered dovetail socket 93 whereupon the locking ring 96 is rotated to move the open space 97 out of alignment with the tapered socket 93 and the tapered dovetail tongue 99 to the position illustrated in FIGS. 20, 21 and 22, thus preventing transverse movement of the tongue 99 with respect to the socket 93, securing the head 91 to the handle socket member 98. When it is desired to remove the handle socket member 98 from the head 91, the locking ring 96 is rotated until the open space 97 thereof is in alignment with the large ends of the tapered dovetail tongue 99 and the tapered dovetail socket 93 to permit the assembly and disassembly of the device, as illustrated in FIGS. 18 and 19.

The use and operation of the form of the invention illustrated in FIGS. 18 through 22 is identical to that of the form of the invention illustrated in FIGS. 1 through 7.

Having thus described the preferred embodiments of the invention, it should be understood that numerous structural modifictions and adaptations may be resorted to without departing from the spirit of the invention.

What is claimed is:

1. In combination an elongate an cylindrical handle, a tool head and a connector detachably securing said handle to said head comprising a handle socket member for rigidly receiving the lower end portion of said handle therein, means in said socket member cooperating with means on said handle for locking said handle against rotation about its axis with respect to said socket, a T-bar tongue integrally secured to the lower end of said socket member and extending transversely thereacross, and upstanding boss formed on said head, a T-slot formed in said boss and extending transversely thereacross to receive said T-bar tongue for sliding movement therethrough, lock means in said boss releasably engageable with said T-bar tongue for rigidly locking said T-bar tongue in said T-slot to rigidly secure said handle to said head with said lock means including a lock bar slidable through said boss in a direction perpendicular to the sliding movement of said T-bar and a lock tongue on said lock bar engageable in a groove in said T-bar.

2. A device as claimed in claim 1 wherein said lock bar has a head on each end thereof to maintain said lock bar in said boss and means are provided for detachably connecting opposite end portions of said lock bar to permit assembly of said lock bar in said boss.

* * * * *